(12) United States Patent
Wimmer et al.

(10) Patent No.: US 9,636,621 B2
(45) Date of Patent: May 2, 2017

(54) AMBIENT PRESSURE OPTIMIZING OF SBRB VSA ASU

(71) Applicant: Pacific Consolidated Industries, LLC, Riverside, CA (US)

(72) Inventors: Robert Wimmer, Breinigsville, PA (US); Jason Burns, Irvine, CA (US); Thomas J. Saari, Corona, CA (US); Tarik Naheiri, Dana Point, CA (US)

(73) Assignee: Pacific Consolidated Industries, LLC, Riverside, CA (US)

( * ) Notice: Subject to any disclaimer, the term of this patent is extended or adjusted under 35 U.S.C. 154(b) by 0 days.

(21) Appl. No.: 14/974,257

(22) Filed: Dec. 18, 2015

(65) Prior Publication Data

US 2016/0184766 A1 Jun. 30, 2016

Related U.S. Application Data

(60) Provisional application No. 62/098,052, filed on Dec. 30, 2014.

(51) Int. Cl.
  *B01D 53/047* (2006.01)
  *B01D 53/00* (2006.01)
  (Continued)

(52) U.S. Cl.
  CPC ........... *B01D 53/002* (2013.01); *B01D 53/02* (2013.01); *B01D 53/0476* (2013.01);
  (Continued)

(58) Field of Classification Search
  CPC ...... B01D 53/002; B01D 53/02; B01D 53/22; B01D 53/229; B01D 53/053; B01D 53/0476; B01D 63/02; B01D 2256/12; B01D 2259/102; B01D 2259/11; B01D 2259/40; B01D 2259/80;
  (Continued)

(56) References Cited

U.S. PATENT DOCUMENTS 4,927,434 A * 5/1990 Cordes ............... B01D 53/0454
  95/15
5,071,453 A * 12/1991 Hradek ............... A61M 16/101
  95/19

(Continued)

*Primary Examiner* — Frank Lawrence
(74) *Attorney, Agent, or Firm* — Heisler & Associates

(57) ABSTRACT

The air separation unit includes a single adsorption bed downstream of a reversing blower and configured to operate on the principle of vacuum swing adsorption. An optimal ambient air pressure to vacuum pressure ratio within an adsorber vessel downstream of the reversible blower is identified. When the air separation unit is operated at ambient conditions where ambient air pressure is different, such as at higher altitude (or lower altitude) a pressure ratio across the blower when drawing a vacuum on the adsorption bed is maintained for optimal blower power to oxygen production performance. Time for recovery of the adsorption bed can also be modified due to the lower absolute pressure achieved within the adsorption bed when the pressure ratio across the blower is maintained. An ASU is thus provided which is optimized for performance at various different altitudes without requiring modification of equipment within the ASU.

18 Claims, 6 Drawing Sheets

Purge Step

(51) Int. Cl.
*B01D 53/02* (2006.01)
*B01D 53/22* (2006.01)
*B01D 63/02* (2006.01)
*B01D 53/053* (2006.01)

(52) U.S. Cl.
CPC ........... *B01D 53/22* (2013.01); *B01D 53/229* (2013.01); *B01D 63/02* (2013.01); *B01D 53/053* (2013.01); *B01D 2256/12* (2013.01); *B01D 2257/102* (2013.01); *B01D 2257/11* (2013.01); *B01D 2257/40* (2013.01); *B01D 2257/80* (2013.01); *B01D 2259/401* (2013.01); *B01D 2259/402* (2013.01); *B01D 2259/40007* (2013.01); *B01D 2259/40009* (2013.01)

(58) Field of Classification Search
CPC ........... B01D 2259/40007; B01D 2259/40009; B01D 2259/401; B01D 2259/402
USPC .... 95/19, 22, 95–98, 100–102, 130; 96/109, 96/113, 114, 143
See application file for complete search history.

(56) References Cited

U.S. PATENT DOCUMENTS

| | | |
|---|---|---|
| 5,415,683 A | 5/1995 | Leavitt |
| 5,429,666 A | 7/1995 | Agrawal |
| 6,277,174 B1 | 8/2001 | Neu |
| 8,496,738 B1 | 7/2013 | Naheiri |
| 2003/0097930 A1 | 5/2003 | Kleinberg |
| 2010/0051030 A1* | 3/2010 | Richard ................ A61M 16/10 128/204.23 |
| 2011/0315140 A1* | 12/2011 | Shuman ................ A61M 16/10 128/204.23 |
| 2014/0190348 A1* | 7/2014 | Richey, II .......... B01D 53/0423 95/96 |

* cited by examiner

AMBIENT PRESSURE OPTIMIZING OF SBRB VSA ASU

CROSS-REFERENCE TO RELATED APPLICATIONS

This application claims benefit under Title 35, United States Code §119(e) of U.S. Provisional Application No. 62/098,052 filed on Dec. 30, 2014.

FIELD OF THE INVENTION

The following invention relates to single bed reversing blower (SBRB) vacuum swing adsorption (VSA) air separation units (ASUs). More particularly, this invention relates to such air separation units which are optimized for performance at higher altitudes than standard atmospheric conditions by selection of target vacuum pressure within an adsorption bed of the ASU.

BACKGROUND OF THE INVENTION

The production of oxygen using vacuum swing adsorption (VSA) is well-known to air separation technologists. VSA offers a simple non-cryogenic method to produce gaseous oxygen at purities of 80% to 95%. In the last 20 years oxygen VSA plants have become widespread and are offered in various bed configurations. The multi-bed VSA is typically used in the size rage of 60 tons per day (TPD) and higher. The single bed process was adopted as a lower capital, simpler process for lower production ranges, typically 1 TPD up to 40 TPD. Typical single bed systems usually consist of a single blower train that is used for both the feed air provider as well as the regeneration vacuum system. The process usually incorporates automatic valves to direct the air and vacuum flows during the cycle. A newer embodiment of the single bed process uses a reversing blower to generate the feed stream and apply vacuum for the regeneration step. This latest embodiment is well suited for small to medium sized oxygen VSA production plants (1 to 10 TPD). One example of a single bed reversing blower (SBRB) VSA process of this type is described in U.S. Pat. No. 8,496,738.

Although the single bed reversing blower (SBRB) VSA process is simple in practice, its simplicity comes with performance trade-offs when compared to multi-bed systems. Firstly, the lack of additional adsorber beds does not allow for a crucial bed to bed equalization. The pressure equalization step is key to lowering power consumption and increasing product oxygen recovery. Technologists in the art have overcome this deficiency by adding an equalization tank to the SBRB system (such as equalization tanks in SBRB systems provided by Air Liquide of Houston, Tex.).

Another problem with reversing blower VSA systems is that they require site specific redesign to accommodate altitude. VSA (and PSA) system performance is closely linked to ambient conditions. Local elevation is a key design factor. When ambient air density is lower than that for which the system is designed, the plant must be derated or the rotating equipment must be modified.

SUMMARY OF THE INVENTION

With this invention, the decrease in absolute pressure is managed by using system pressure parameters to control the VSA process. In particular, system pressure parameters are adjusted to control the compression ratio across the main process blower. As an example, first the optimal pressure ratio between inlet air and lowest pressure within the VSA system is determined. This pressure ratio is then matched by adjusting the operating parameters for the site specific VSA unit.

For instance, if the desirable blower compression ratio is 10 to 1 with the design ambient pressure being 14.7 psi, the pressure drop across the blower with a 10 to 1 compression ratio would provide pressure at 1.47 psi on the low pressure side of the blower when a vacuum is drawn on the adsorption bed. In such an example, if the unit were to be installed at a location where the ambient pressure was 12 psi, to maintain a similar 10 to 1 compression ratio, the pressure on the vacuum side of the blower would be 1.2 psi. The compression ratio is thus maintained. Other accompanying modifications can also be made if warranted, including adjusting of cycle time if needed to fully achieve optimal performance of the overall system.

The air separation efficiency is maintained due to the molecular sieve material properties within the vacuum-pressure profile used. This can be seen in the nitrogen selectivity documented in the isotherm for the molecular sieve. Examining the isotherm, it can be seen that, as the absolute pressure decreases and the pressure profile is adjusted accordingly, the selectivity for nitrogen improves for the molecular sieve material used.

A controller is provided which senses pressure within the adsorber vessel and typically also has an ambient air pressure sensor, but which could be pre-configured to operate at a known ambient pressure. The controller also outputs a signal to the reversible blower. This signal can be in the form of a power level to cause the reversible blower to achieve a target vacuum pressure within the adsorber vessel, and also can be in the form of a time interval between when the air separation unit operates in a production mode or in a recovery mode during cycles performed by the SBRB VSA ASU. The controller is configured so that the vacuum pressure within the adsorber vessel during the recovery mode is sufficiently low that a pressure ratio across the blower during this recovery matches a desired optimal pre-determined ambient-to-vacuum pressure ratio across the reversible blower, such as that established for efficient operation of the ASU when operating at ambient air pressure conditions (e.g. at sea level). Thus, the system operates with the same pressure ratio even though ambient air pressure is lower than that present at sea level. The time interval between production and recovery phases is typically shortened because the media within the adsorber vessel recovers more quickly when at an absolute pressure that is lower than what is the case when operating at the same pressure ratio but at higher ambient pressures.

OBJECTS OF THE INVENTION

Accordingly, a primary object of the present invention is to provide a method for optimization of a single bed reversing blower (SBRB) vacuum swing adsorption (VSA) air separation unit (ASU) for effective operation at various different altitudes.

Another object of the present invention is to provide an ASU which can accommodate operation at different altitudes without requiring equipment changes, but merely adjusting parameters of operation, while still maintaining a large degree of operational efficiency.

Another object of the present invention is to provide a SBRB VSA ASU which benefits from the faster recovery of adsorption media at lower absolute pressures within the adsorption bed.

Another object of the present invention is to provide a method for operation of a SBRB VSA ASU which matches a pressure ratio between ambient air pressure and vacuum pressure during a recovery step of the VSA process for optimal performance.

Other further objects of the present invention will become apparent from a careful reading of the included drawing figures, the claims and detailed description of the invention.

DESCRIPTION OF THE PREFERRED EMBODIMENT

Figure 1:
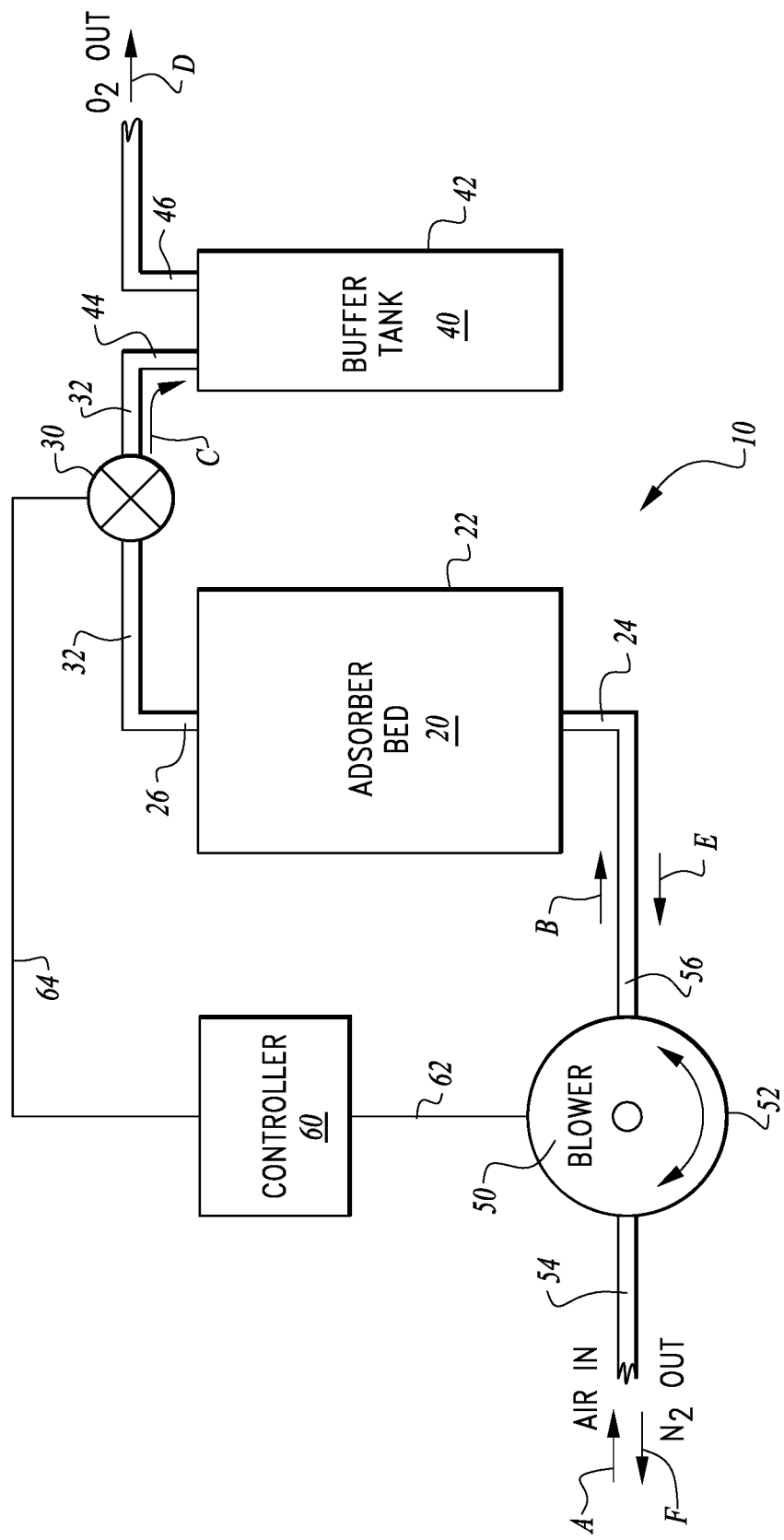
FIG. 1 is a schematic of a prior art single bed reversing blower vacuum swing adsorption air separation unit to which the technology of this invention is addressed.

Referring to the drawings, wherein like reference numerals represent like parts throughout the various drawing figures, reference numeral 10 (FIG. 1) is directed to a prior art oxygen separator configured to separate/concentrate oxygen from air. This separator is modified by the air separation unit 110 of this invention (FIGS. 2-5) and the blower driving system 210 of this invention (FIG. 4), as explained in detail below.

In essence, and with particular reference to FIG. 1, basic details of the oxygen separator 10 modified by the air separation unit 110 and blower driving system 210 of this invention are disclosed. The oxygen separator 10 includes an adsorber bed 20 including an adsorber material therein which preferentially adsorbs nitrogen, $CO_2$ and water over oxygen. A valve 30 is located downstream of the adsorber bed 20. A buffer tank 40 is provided downstream of the valve 30. A blower 50 defines a preferred form of pump located upstream of the adsorber bed 20. A controller 60 is coupled to the valve 30 and the blower 50 (or other pump) to control opening and closing of the valve 30 and to control a direction in which the blower 50 (or other pump) is operating, to either provide air into the adsorber bed 20 or pull a vacuum to desorb and remove nitrogen out of the adsorber bed 20. Normally, a heat exchanger is required between the blower and the adsorber bed to remove the heat generated when the air is compressed. The heat exchanger may be bypassed during the vacuum phase of the cycle.

With continuing reference to FIG. 1, details of the adsorber bed 20 are described. The adsorber bed 20 includes an enclosure 22 for containing the adsorber material. This enclosure 22 includes an inlet 24 spaced from an outlet 26. The inlet 24 and outlet 26 define preferred forms of first and second ports for access into the enclosure 22. The inlet 24 and outlet 26 normally are incorporated in closures or "end plates" which can be removed to allow access to the adsorption components in the enclosure 22. Otherwise, the enclosure 22 is preferably sealed to prevent leakage of gases into or out of the enclosure 22.

The adsorber material within the adsorber bed 20 could be any form of material which preferentially adsorbs nitrogen over oxygen. One such material is molecular sieve such as nitroxy siliporite. This material is preferably supplied in the form of beads which are either generally spherical in form or can be of irregular shape. Since the beads are composed of molecular sieve material within the enclosure 22, gaseous pathways extend through, between and around the adsorbent material.

Most preferably, a plenum is configured at the inlet and the outlet end of the adsorber bed to provide even gas flow across the cross section of the bed. In a preferred configuration, the inlet 24 is located below the outlet 26, and with the inlet 24 at a lowermost portion of the enclosure 22 and the outlet 26 on an uppermost portion of the enclosure 22. The enclosure 22 could have a variety of different shapes. In one embodiment, the enclosure 22 could be generally rectangularly shaped. The enclosure could be shaped like a pressure vessel to maximize an amount of vacuum to be drawn on the enclosure 22 while minimizing an amount of material strength (i.e. wall thickness or material choice) that must be designed into the enclosure 22. If the size of the adsorber material is sufficiently small to potentially pass through the inlet 24 or outlet 26, filters are provided at the inlet 24 and outlet 26 to keep the adsorbent material within the enclosure 22.

With continuing reference to FIG. 1, details of the valve 30 are described. The valve 30 is interposed on a line 32 extending from the outlet 26 of the adsorber bed 20 and extending to the buffer tank 40. This line 32 is preferably substantially rigid, especially between the valve 30 and adsorber bed 20, so that when a vacuum is drawn on the adsorber bed 20, the line 32 does not collapse. The valve 30 is preferably sealed to prevent leakage in any manner when in a closed position and to only allow passage of gas along the line 32 when in an open position.

The valve 30 is preferably coupled to a controller 60 which controls the opening and closing of the valve 30. Optionally, the valve 30 could have a controller built into the valve 30 that could be set a single time and then operate in accordance with its settings.

While the valve 30 would typically be programmed once and then operate in accordance with such settings, the valve 30 could optionally be controlled at least partially through a control system including sensors and feedback to the valve 30. For instance, an oxygen sensor could be provided adjacent the valve 30 or along the line 32 between the valve 30 and the adsorber bed 20 to detect oxygen concentration levels approaching the valve 30. Nitrogen adjacent the valve 30 would be indicative that the adsorbent material within the adsorber bed 30 is saturated with nitrogen and that the oxygen separator 10 needs to change operating modes, to have the blower 50 (or other pump) reverse to pull a vacuum and desorb nitrogen from the adsorber material and pull the nitrogen out of the adsorber bed 20 to recharge the system.

Normally control of the cycle is achieved with the use of pressure transducers which reverse the blower at appropriate times. Usually the purge cycle is initiated when the vacuum reaches a certain predetermined level. The valve 30 is then opened for a predetermined amount of time so that a purge layer of oxygen is allowed to purge the remaining nitrogen from the bed. So the pressure and vacuum cycle are determined by pressure and the purge portion of the cycle is timed.

Other sensors could also potentially be utilized to allow the oxygen separator 10 to operate most effectively. The valve 30 is preferably of a type which operates with a minimum of lubricant or which can operate with a lubricant which is compatible with the handling of oxygen. The valve 30 and other portions of the oxygen separator 10 are also preferably formed of materials which are compatible with the handling of oxygen. For instance, brass is often effective in handling of oxygen and so brass is one material from which the valve 30 could be suitably manufactured when the system 10 is used for oxygen separation.

With continuing reference to FIG. 1, details of the buffer tank 40 are described. The buffer tank 40 is not strictly required for operation of the system, but allows for the system in the form of the oxygen separator 10 to deliver oxygen substantially continuously, and to moderate pressure spikes in the system. The buffer tank 40 includes an enclosure 42 with an input 44 and an output 46 in FIG. 1. However, normally the buffer tank does not have a separate inlet and outlet. Since its purpose is simply to be an accumulator and minimize the pressure fluctuations inherent in the pressure swing adsorption process. The input 44 is coupled to the line 32 on a side of the valve 30 downstream from the adsorber bed 20.

The buffer tank 40 would typically have some form of regulator valve on the output 46 which would deliver oxygen out of the buffer tank 40 when oxygen is required by oxygen utilizing systems downstream of the buffer tank 40. The input 44 of the buffer tank 40 can remain in fluid communication with the valve 30. The buffer tank 40 can contain oxygen at above atmospheric pressure and at a pressure matching or slightly below an operating pressure of the adsorber bed 20 when the adsorber bed 20 is actively adsorbing nitrogen and oxygen flows into the buffer tank 40.

A sensor can be associated with the buffer tank 40 which cooperates with the controller 60 to shut off the oxygen separator 10 when the buffer tank 40 nears a full condition. In many applications a compressor is located downstream from the buffer tank 40 to fill oxygen vessels. When the vessels are full the system would be shut off. If required, a pressure regulator can also be provided on the output 46 of the buffer tank 40 so that pressure of oxygen supplied out of the buffer tank 40 remains substantially constant. Similarly, an oxygen pump could be provided downstream of the buffer tank 40 if the oxygen were required to be supplied at an elevated pressure above pressure within the buffer tank 40.

Most preferably, the buffer tank 40 is not a particularly high pressure tank so that the oxygen separator 10 including the blower 50 (or other pump) and adsorber bed 20 do not need to operate at a particularly high pressure when delivering oxygen to the buffer tank 40. By minimizing the pressure of the buffer tank 40, the weight of the buffer tank 40 (and other components of the system 10) can be significantly reduced. Furthermore, the power consumed by the blower is reduced as the pressure drop across the blower is reduced.

With continuing reference to FIG. 1, details of the blower 50 (or other pump) are described. This blower 50 generally includes a housing 52 with some form of prime mover therein coupled to a driver, such as an electric motor. The housing 52 of the blower 50 includes an entry 54 in direct access with a surrounding environment in a preferred embodiment. A discharge 56 is also provided on the housing 52 which is located on a side of the blower 50 closest to the adsorber bed 20.

The blower 50 is preferably in the form of a two or three lobed rotary blower coupled in direct drive fashion to an electric motor. In one embodiment the electric motor is a five horsepower three phase motor and the rotary blower is a two or three lobed blower and can deliver approximately one hundred cubic feet per minute when operating at atmospheric pressure. This rotary blower is also preferably configured to have acceptable performance when drawing a vacuum on the adsorber bed 20.

The lobes of the rotary blower are preferably configured so that they are of approximately similar efficiency in moving gases through the blower 50 between the entry 54 and the discharge 56 in either direction. In one form, the lobes are thus symmetrical in form so that they act on the air similarly in both directions of rotation for the blower 50.

The blower 50 is preferably substantially of a positive displacement type so that it maintains an adequate performance when drawing a vacuum on the adsorber bed 20 so that nitrogen can be effectively desorbed from the adsorber material in the adsorber bed 20 when the blower 50 is operating in a reverse direction to pull nitrogen out of the adsorber bed 20 and deliver the nitrogen out of the entry 54.

Most preferably, the blower 50 is coupled in direct drive fashion to the electric motor (or though a gear box). Most preferably, the electric motor is a three phase alternating current motor which can easily be reversed by reversing two of the phases. In this way, the controller 60 need merely reverse two poles of the three phase motor. In an other embodiment a direct current, permanent magnet may be used wherein the direction of the rotation can be reversed by reversing the polarity which in turn will reverse the rotation of the blower. Almost all three phase electric motors are capable of being reversed as above. Direct current motors are also readily available from many manufacturers which reverse their rotation direction by changing polarity.

Other types of pumps could alternatively be utilized for drawing air into the adsorber bed 20 and pulling nitrogen out of the adsorber bed 20 for the oxygen separator 10. For instance, such a pump could be a positive displacement pump, such as a piston pump or a peristaltic pump. Other forms of positive displacement pumps could also be utilized including gerotor pumps, gear pumps, etc. Other forms of pumps rather than strictly positive displacement pumps could also be selected, such as centrifugal pumps or axial flow pumps. The most efficient scheme for pumping the air into the system and exhausting the bed depends on the requirements of the final user.

With continuing reference to FIG. 1, details of the controller 60 are described according to a preferred embodiment. The controller 60 is shown as a separate unit coupled to the blower 50 (or other pump) through a blower signal line 62 and coupled to the valve 30 through a valve signal line 64. The controller 60 could in fact be integrated into the valve 30 or integrated into the blower 50 (or other pump) or be provided as a standalone unit such as depicted in FIG. 1. It is also understood that the controller 60 could be split into two (or more) separate devices, either separate from the blower 50 and valve 30 or integrated into both the blower 50 and valve 30.

The controller 60 provides the basic function of controlling a direction in which the blower 50 is operating and whether the valve 30 is open or closed. Control systems have been used which simply time the cycle. More often, the controller is configured to react to pressure or some other input.

A preferred sequence for directional control of the blower 50 and opening and closing of the valve 30 are described in detail below. The controller 60 could be in the form of a programmable logic device or could be in the form of an application specific integrated circuit, or could be in the form of a CPU of a special purpose computer or a general purpose personal computer or other computing device. The controller 60 could be configured to have operating parameters set at a central controlled location, such as during manufacture, or could be configured to allow for programming in the field before and/or during operation.

In use and operation, and with particular reference to FIG. 1, details of the operation of the oxygen separator 10 of the prior art are described. It will be understood that the separator 10 would operate similarly when separating other gases than when separating oxygen from air, and the operation as an oxygen separator 10 is provided merely as one example.

Initially, the system 10 is configured with the valve 30 closed and the blower 50 (or other pump) is caused to rotate in a direction driving gases out of the adsorber bed 20 (along arrow E). This is the vacuum cycle used to desorb nitrogen out of the beads in the bed 20. In particular, the blower 50 rotates to cause gases to be pulled into the entry 54 (along arrow E). This gas is removed from the bed 20 by the blower 50 and caused to pass through the discharge 54 away from the adsorber bed 20 along arrow F and to the surrounding atmosphere.

Nitrogen (or other undesirable gas) is adsorbed by the adsorber material within the adsorber bed 20. Most typically, the adsorber material also adsorbs water vapor and carbon dioxide, as well as potentially trace amounts of other gases, including pollutants.

During the last portion of the vacuum cycle valve 30 is opened to allow a small amount of the contents of the buffer tank to be introduced into the adsorber bed. This step is called the "purge phase." The purge phase is used to purge nitrogen (as well as some carbon dioxide and water out of plumbing lines and free space between the valve 30 and the blower 50, but not appreciably out into the surrounding atmosphere. This short purge phase is typically timed to match an amount calculated or determined by experiment, but could also be ended based on sensor readings. This purge phase ends the vacuum cycle and precedes the adsorption cycle to follow.

The blower is then reversed to commence the adsorption cycle. Air is drawn into the blower at the inlet 54 port of the blower 50 (in the direction shown by arrow A). The air flows (along arrow B) into the adsorber bed 20 where nitrogen, carbon dioxide, and water are preferentially adsorbed. The gas not adsorbed in the adsorber bed (normally a mixture of oxygen and argon) is passed through valve 30 into the buffer tank 40.

The adsorber bed 20 might also adsorb oxygen to some extent. However, the adsorber material is selected so that it preferentially adsorbs nitrogen more than oxygen. Due to the presence of the adsorber material within the adsorber bed 20, substantially only oxygen (or other desirable gas) can leave the adsorber bed 20 through the outlet 26. Typically, argon also remains with the oxygen. Because air is approximately 1% argon and approximately 20% oxygen, this twenty to one ratio typically causes the gases being discharged from the adsorber bed 20 at the outlet 26 to be approximately 95% oxygen and 5% argon.

Because the valve 30 is opened, this oxygen can flow (along arrow C) through the valve 30 and into the buffer tank 40. The buffer tank 40 is thus charged with oxygen. If oxygen is desired, it can be discharged from the buffer tank 40 output 46 (along arrow D). The adsorber material within the adsorber bed 20 eventually becomes saturated with nitrogen and other compounds, such as water vapor and carbon dioxide. The point of such saturation can be calculated in advance and calibrated into the separator 10. Alternatively, a sensor can be provided, such as along the line 32 adjacent the valve 30, to sense for nitrogen or other contaminants within what should be substantially only oxygen and argon. Such a sensor can cause the system to detect such saturation of the adsorbent material within the adsorber bed 20 and thus change the mode of operation of the oxygen separator 10 from the adsorption cycle to the vacuum cycle. Other sensors to trigger the change could be pressure sensors or volumetric flow rater sensors either alone or in combination with a clock or a calibration table. The goal is to prevent nitrogen or other contaminates from passing the valve 30 after adsorption bed 20 saturation.

When such saturation has either been sensed as occurring or predicted to occur, the separator 10 changes operation modes by closing the valve 30. Then the blower 50 (or other pump) reverses its direction of operation. For instance, the controller 60 can reverse two of the three phases of a three phase electric motor coupled to the blower. The blower 50 is then caused to turn in an opposite direction and begins pulling gas (along arrow E) out of the adsorber bed 20 and into the blower 50 from the discharge 56 and out of the blower 50 through the entry 54 and out into a surrounding environment, as a repeat of the vacuum cycle described above.

The controller 60 can be programmed with a typical amount of time required to effectively desorb the nitrogen from the adsorbent material within the adsorber bed 20. Normally, the controller 60 senses a threshold low pressure in the adsorber bed 20. The system operation then continues as described above with a short purge phase followed by return to the desorption cycle.

This operating sequence for the oxygen separator 10 can repeat itself potentially indefinitely. When the buffer tank 40 becomes full (or vessels being filled from the buffer tank 40 are full), an appropriate sensor associated with the buffer tank 40 can indicate that it is full and shut off the oxygen separator 10. As further amounts of oxygen are sensed as being needed, such as by a drop in pressure in the buffer tank 40, a signal can be sent to the controller 60 to again cause the system to commence operation.

With this invention a modified air separation unit 110 implements a modification of the prior art single bed reversing blower (SBRB) vacuum swing adsorption (VSA) oxygen separator 10 through the air separation unit 110 of this invention and the driving system 210 described in more detail below. The SBRB VSA air separation unit (ASU) 110 is modified in this exemplary ASU 110 to include a purge recovery tank 160. Many other portions of the ASU 110 have analogs in the prior art SBRB VSA technology such as that shown in FIG. 1.

Figure 2:
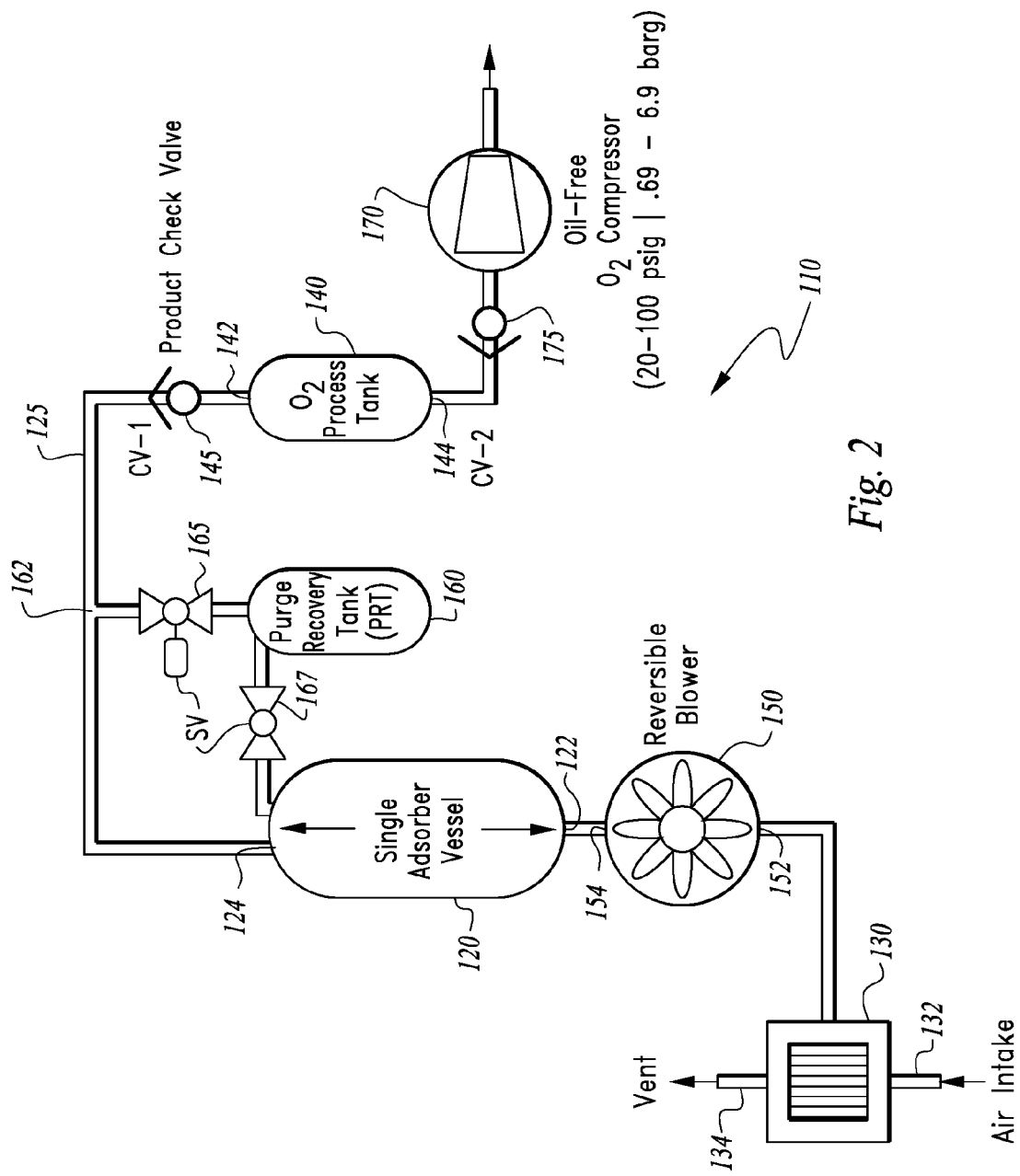
FIG. 2 is a schematic of a single bed reversing blower vacuum swing adsorption air separation unit incorporating a purge recovery tank therein to enhance performance of the air separation unit and defining a modified vacuum swing adsorption air separation process according to this invention.

In essence, and with particular reference to FIG. 2, basic details of the ASU 110 are described, according to a preferred embodiment with the ASU 110 also typically including many of the details of the oxygen separator 10 as described above. A single adsorber vessel 120 is fed by an intake 130 which supplies air to the vessel 120. Downstream of the vessel 120, an $O_2$ supply line 125 leads to an $O_2$ process tank 140 which is optionally provided to contain excess O₂ before it is utilized by equipment and/or for processes downstream of the O₂ process tank 140. A reversible blower 150 is interposed between the adsorber vessel 120 and the intake 130. A purge recovery tank 160 is coupled to the O₂ supply line 125 downstream of the vessel 120, preferably through a control valve 165 to control whether the purge recovery tank 160 is open or closed. A compressor 170 is preferably provided downstream of the O₂ process tank which can control pressure of O₂ supplied from the ASU 110.

More specifically, and with continuing reference to FIG. 2, specific details of the ASU 110 are described. The single adsorber vessel 120 extends between an inlet 122 and an outlet 124, with the inlet 122 defining a side of the vessel 120 closest to the intake 130 and the outlet 124 on a side of the vessel 120 opposite the inlet 122. This vessel 120 can have any of a variety of configurations. While this vessel 120 is described as a single adsorber vessel 120, it is conceivable that a manifold upstream and downstream of the single adsorber vessel 120 could be provided so that multiple vessels 120 could be provided in parallel, but operating in unison so that the ASU 110 is still functioning as a single bed reversing blower (SBRB) system but with optionally additional vessels 120 merely to adjust size of the vessel 120.

The vessel 120 contains an adsorption material which preferentially adsorbs N₂ over O₂. This material is typically provided in the form of beads or other solid media which allow for gas to flow about the solid media as the gas extends from the inlet 122 to the outlet 124, and past surfaces of the adsorption material. Surfaces of the adsorption material adsorb nitrogen thereon, allowing O₂ to pass through the vessel 120. Typically, the material within the vessel 120 also adsorbs water vapor and various other gases, while typically argon within the air is not adsorbed but passes out of the vessel 120 along with the oxygen. The vessel 120 includes a container wall which is sufficiently strong so that it can maintain its volume when experiencing pressures ranging from near vacuum at a low end to approximately atmospheric (but potentially slightly higher than atmospheric pressure) at a high end.

The intake 130 in a simplest form merely includes an opening which is open to a surrounding atmosphere for intake of air into the ASU 110. In the embodiment depicted, the intake 130 can include some form of filter element, such as a particulate filter and includes an air port 132 spaced from a purge port 134. A valve within the intake 130 causes air to be drawn in through the air port 132 when the blower 150 is drawing air into the vessel 120, and the purge port 134 discharges gas (including mostly N₂) when the blower 150 has reversed and is pulling gas out of the vessel 120. The purge port 134 is preferably spaced from the air port 132 to minimize the potential for nitrogen exhaust to find its way back into the air port 132. If desired, the purge port 134 can lead to other equipment such as nitrogen recovery equipment.

Figure 4:
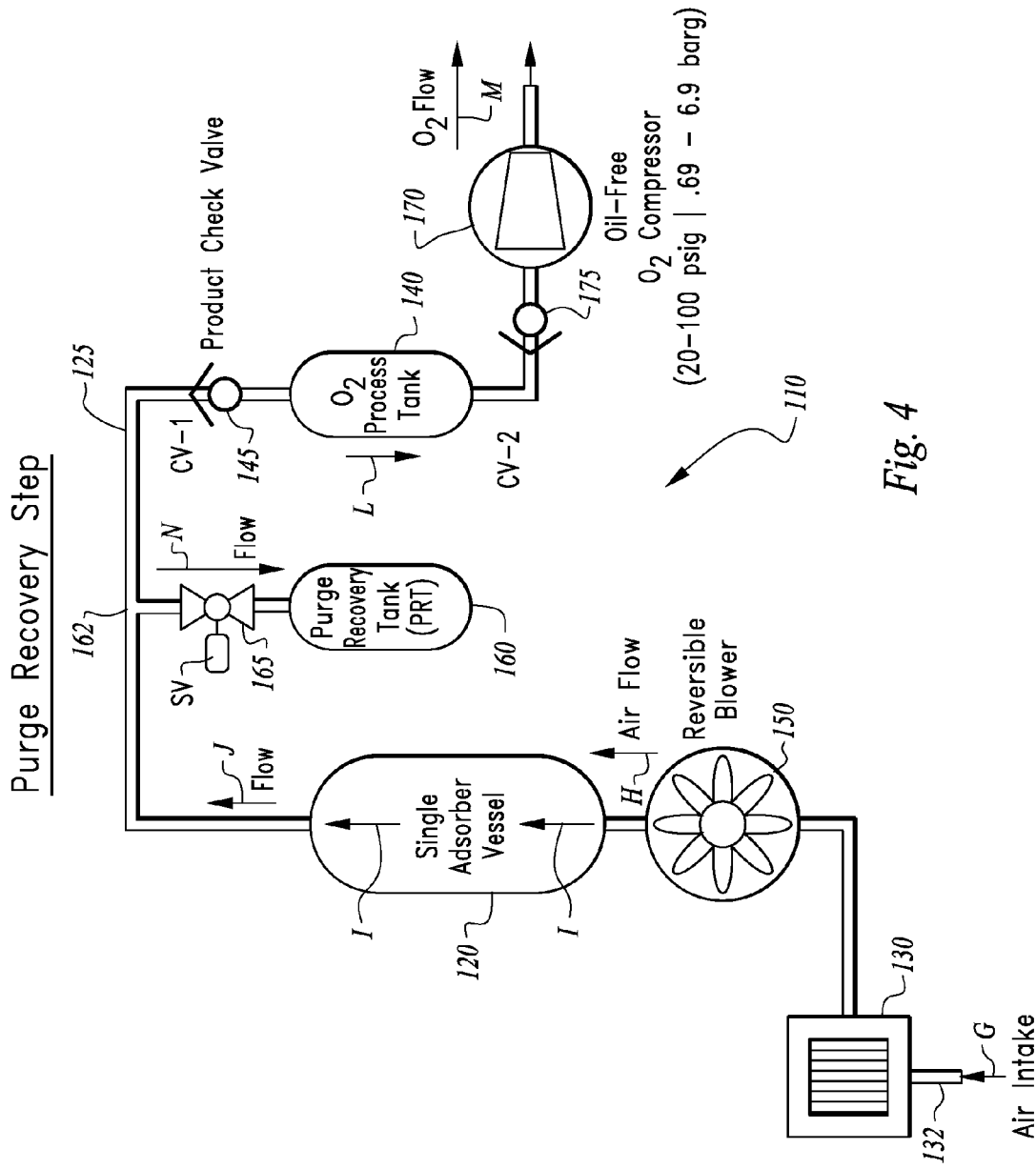

Regions downstream of the vessel 120 are together generally referred to collectively as the O₂ output in that gas of mostly O₂ remains in these portions of the ASU 110. The 02 process tank 140 could be avoided in systems where oxygen is used as it is produced or where discharge of excess O₂ beyond that utilized by the equipment downstream of the ASU 110 can merely be discharged to atmosphere, or can be avoided in systems where downstream equipment from the ASU 110 itself includes appropriate volume, such as in the form of tanks or other equipment so that the O₂ process tank 140 is not needed. However, typically an O₂ process tank 140 is provided to hold excess O₂ produced when the reversible blower 150 is driving air into the vessel 120 and the ASU 110 is producing O₂, so that when the blower 150 reverses and the vessel 120 is in recovery mode and discharging nitrogen therefrom, O₂ can continue to be supplied from the O₂ process tank 140 to supply downstream oxygen utilizing equipment (FIG. 4).

Most preferably, a product check valve 145 is provided upstream of the O₂ process tank 140. This check valve 145 acts to keep pressurized oxygen within the O₂ process tank 140 and preventing back flow of oxygen back toward the vessel 120. This product check valve 145 also provides one form of valve within the O₂ supply line 125 which the reversible blower 150 works against so that an at least partial vacuum can be drawn on the vessel 120, without significant leakage of any gases into the vessel 120 from the O₂ supply line 125. Such a vacuum is needed to allow for recovery of the material within the vessel 120 by causing the material to give up the N₂ and return to a state where it is ready to again preferentially adsorb N₂ and supply O₂ to the O₂ process tank 140. The O₂ process tank 140 includes an inlet 142 opposite an outlet 144 with the inlet 142 adjacent to the product check valve 145 and the outlet 144 leading further into equipment downstream of the ASU 110 which utilize oxygen.

The reversible blower 150 includes an inlet 152 on a side of the reversible blower 150 closest to the intake 130 and an outlet 154 on a side of the reversible blower 150 opposite the inlet 152. This reversible blower 150 is preferably a positive displacement pump, most typically of a rotary lobe variety which can both efficiently blow air through the vessel 120 to produce oxygen, but also effectively draw a vacuum on the vessel 120 when reversed. The motor coupled to the rotary lobe prime mover of the reversible blower 150 is most preferably a type of electric motor which can readily be reversed in direction, such as by reversing a polarity of an electric field associated with the electric motor, or some other type of electric motor which can be readily reversed in the direction that it is operating with a minimum of stress on the equipment associated with the reversible blower 150. Typically, a controller is coupled to the reversible blower 150 which sends a signal at an appropriate time to the reversible blower 150 to cause it to reverse from pushing air into the vessel 120 to pulling gas out of the vessel 120.

The purge recovery tank 160 is preferably provided with an opening thereinto coupled to the O₂ supply line 125, preferably at a junction 162 between the outlet 124 of the vessel 120 and the product check valve 145. As an alternative, the purge recovery tank 150 can be coupled directly to the adsorber vessel 120 typically at a portion of the adsorber vessel 120 on a side of the vessel 120 opposite the inlet 122.

A control valve 165 is interposed between the tank 160 and the O₂ supply line 125. Alternatively, this control valve 167 can be interposed between the tank 160 and the vessel 120. In either configuration, the control valve 165, 167 transitions from a closed state where the purge recovery tank 160 is isolated from the O₂ supply line 125 and the adsorber vessel 120 and an open state where the purge recovery tank 160 is open to the 02 supply line 125 and/or adsorber vessel 120. The control valve 165, 167 is typically coupled to a servo motor so that it is in the form of a servo valve (SV).

The control valve 165 is coupled to a controller which can be coupled to or the same as the controller associated with the reversible blower 150, so that opening and closing of the purge recovery tank 160 occurs in a synchronized fashion with reversing of the reversible blower 150. If desired, such a controller or group of controllers can also be coupled to sensors such as a nitrogen sensor which can detect trace amounts of $N_2$ downstream of the vessel 120 and indicative that the material within the vessel 120 is approaching saturation and the need to enter a recovery phase by reversing the reversible blower 150 and drawing nitrogen out of the vessel 120 through drawing a vacuum within the vessel 120. The controller can optionally include a clock and reverse the blower (and open/close the valve 165, 167) after set amounts of time have passed.

The compressor 170 is optionally provided downstream of the $O_2$ supply line 125 and downstream of any $O_2$ process tank 140. Preferably a compressor check valve 175 is provided upstream of the compressor 170. The compressor 170 allows for control of a pressure desired for $O_2$ supplied from the ASU 110. The compressor check valve 175 assists in keeping $O_2$ downstream of the compressor 170 from backing up into the ASU 110.

Figure 3:
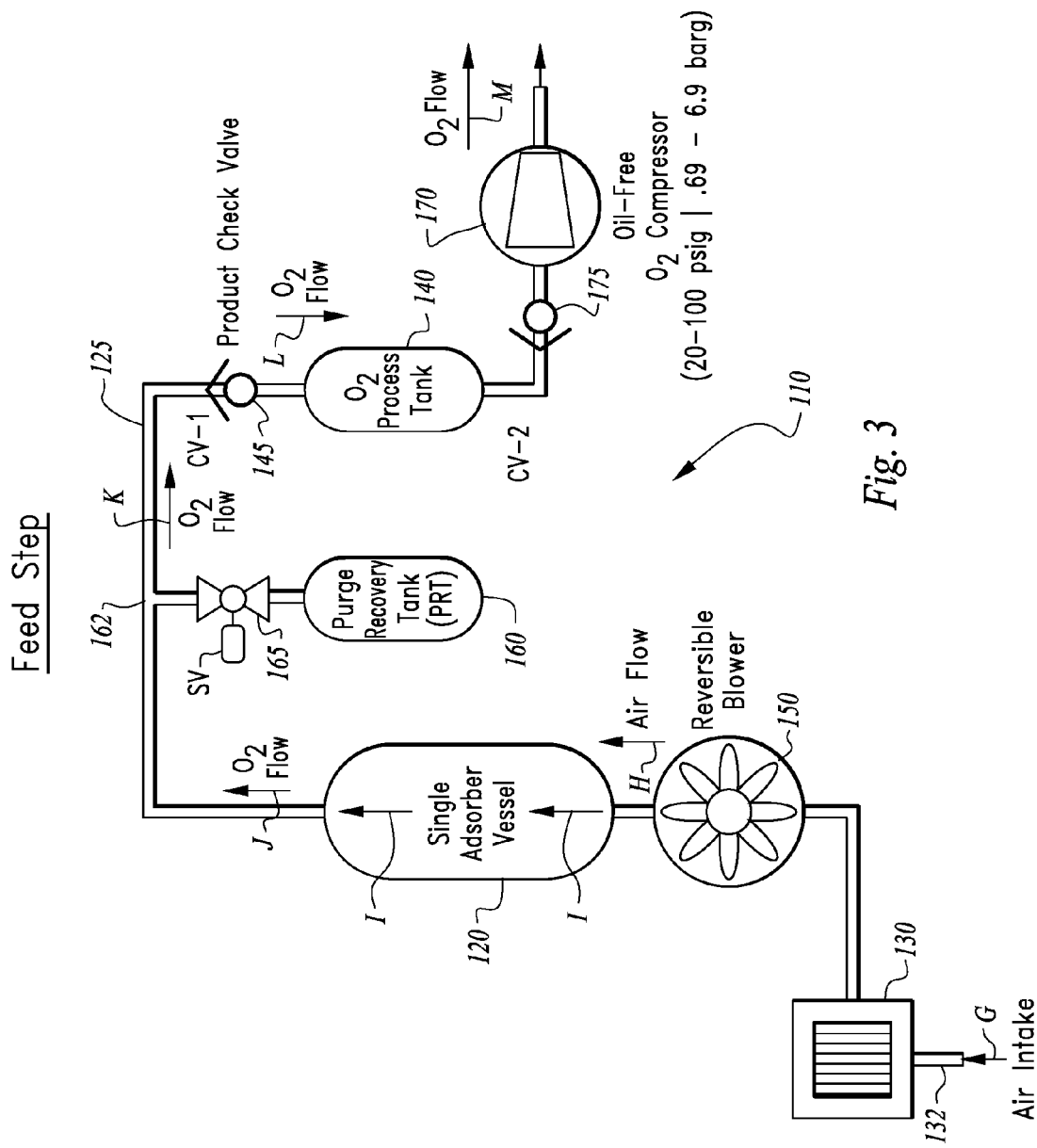
FIGS. 3-5 are schematics similar to that which is shown in FIG. 2, but with various different arrows depicting various steps in the operation of the reversing blower vacuum swing adsorption air separation unit according to this invention.
Figure 5:
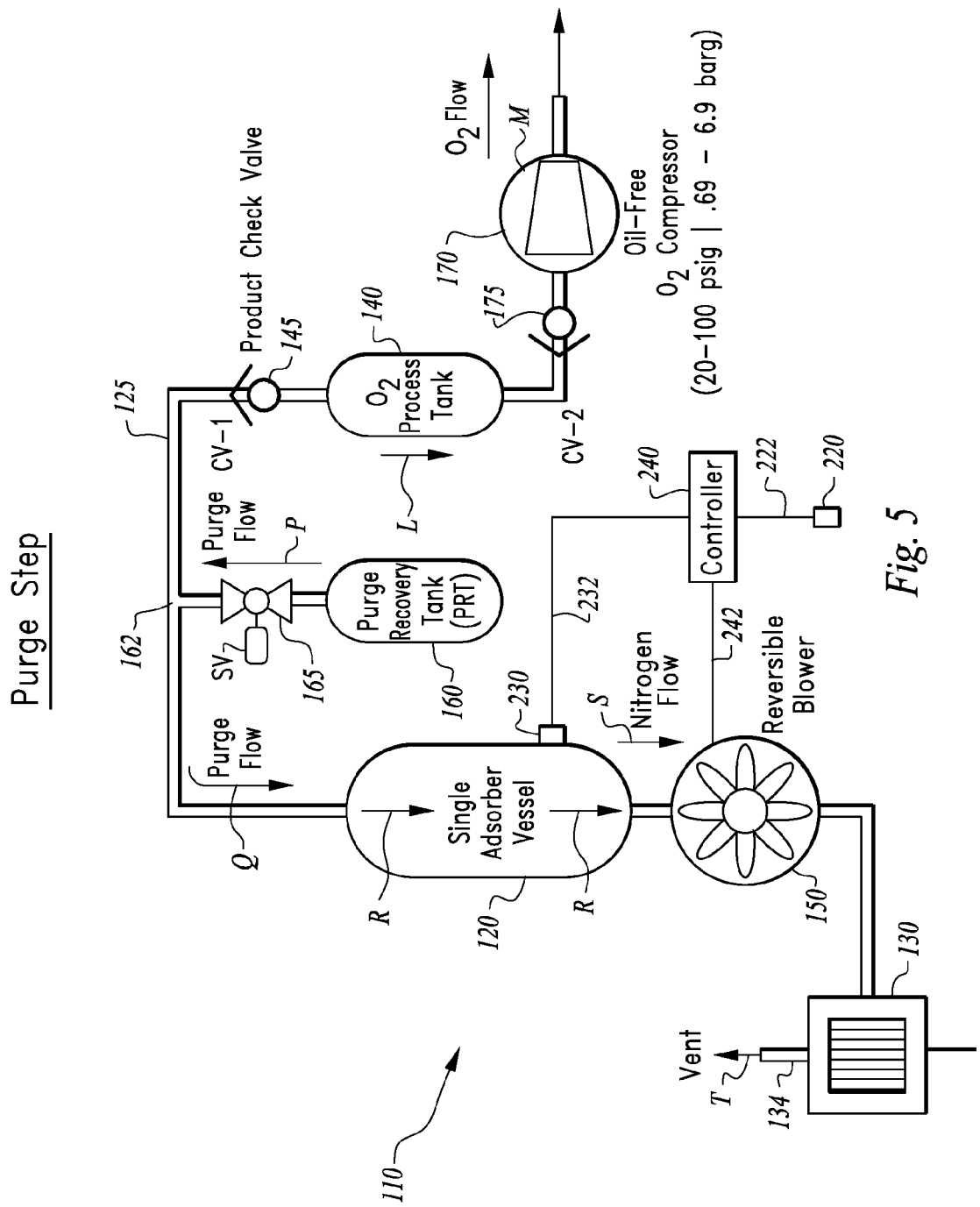

With particular reference to FIGS. 3-5, general steps in operation of the ASU 110 are described. FIG. 3 depicts a feed step for the ASU 110. In this step the reversible blower 150 draws air from the air intake 130 through the air port 132, along arrow G. The blower 150 drives air along arrow H into the vessel 120. The air passes through the vessel 120 (along arrow I) where nitrogen is selectively adsorbed. Gas of mostly $O_2$ flows out of the vessel 120 (along arrow J) and within the $O_2$ supply line 125. The control valve 165 of the purge recovery tank 160 is closed during the beginning of the feed step so that $O_2$ flow continues past the junction 162 and through the $O_2$ supply line 125 (along arrow K). The oxygen then passes through the product check valve 145 and into the $O_2$ process tank 140 (along arrow L). Further, the $O_2$ can flow through the compressor check valve 175 and through the compressor 170 for discharge from the ASU 110 (along arrow M).

Such a feed step (as depicted in FIG. 3) continues as long as the material within the vessel 120 has excess capacity for adsorption of nitrogen. When this adsorption material within the vessel 120 becomes saturated with nitrogen, the ASU 110 needs to prepare for recharging the adsorption material within the vessel 120. To detect that such recharging/restoration of the material within the vessel 120 is needed, the ASU 110 can follow a timing circuit or follow gas flow valves which measure an amount of gas flow, or can include a nitrogen sensor or other sensor downstream of the vessel 120 which indicate that the gas downstream of the vessel 120 is indicative that recharging/reconditioning of the material within the vessel 120 is needed.

Preparation for recovery of the material within the vessel 120 can occur in a couple of slightly different but closely related ways. In one embodiment, such preparation begins by opening of the control valve 165 (or valve 167). The interior of the pressure recovery tank 160 preferably has pressure below atmospheric pressure so that gas of mostly oxygen (but with perhaps some nitrogen present) flows quickly into the purge recovery tank 160 through the control valve 165.

When the purge recovery tank 160 is full, or when the purge recovery tank 160 is achieving a fill level which is sufficiently great to satisfy its purposes in purge recovery for the vessel 120, the control valve 165 is closed. The purge recovery tank 160 thus contains and holds a charge of mostly $O_2$ (but typically with some $N_2$ and other contaminates present) as a purge charge which can be at near atmospheric pressure, or conceivably above atmospheric pressure if pressure downstream of the vessel 120 is above atmospheric pressure.

The reversible blower 150 is instructed to reverse so that air is no longer driven into the vessel 120, but the blower 150 reverses and gases begin to be pulled out of the vessel 120, through the reversible blower 150 and back to the intake 130. The precise moment of beginning reversing of the reversible blower 150 could be before the control valve 165 associated with the purge recovery tank 160 has closed, or could be at the same time that the control valve 165 closes, or could be slightly after the control valve 165 closes. The reversible blower 150 typically takes some time to stop moving in a forward direction and then begin moving in a reverse direction. This slow down to zero velocity and speed up in a reverse direction also define a time period which can be during which the control valve 165 closes or immediately before or immediately after the control valve 165 closes.

The reversible blower 150 then operates in a reverse direction drawing a vacuum on the adsorber vessel 120 and portions of the $O_2$ supply line 125 between the adsorber vessel 120 and the product check valve 145 or other valve on the $O_2$ supply line 125 which resists the draw of vacuum within the $O_2$ supply line 125. Pressure is thus reduced within the $O_2$ supply line 125 and the adsorber vessel 120. Gas flow through the vessel 120 occurs along arrow R of FIG. 5. As the pressure is reduced within the adsorber vessel, the ability of the material within the vessel 120 to hold $N_2$ decreases. $N_2$ is thus released from the adsorber material and flows, along arrow S (FIG. 5) through the reversible blower 150 and out of the purge port 134 of the intake 130 (along arrow T of FIG. 5). After a sufficient amount of time and sufficiently low pressure is achieved within the vessel 120 to satisfactorily allow the material within the vessel 120 to recover, the ASU 110 then undergoes preparation for re-reversing the reversible blower 150 and returning the ASU 110 back to the feed mode (FIG. 3). This preparation typically initially involves opening of the control valve 165 (or valve 167) associated with the purge recovery tank 160. The mostly $O_2$ (with some $N_2$) gas that has been stored therein is thus released through the control valve 165 and into the $O_2$ supply line 125 (or directly into the vessel 120 through the valve 167 of FIG. 2).

This purge of mostly $O_2$ with other gases into the low pressure vessel 120 allows for pressure within the vessel 120 to be quickly restored and also for the low quality purge gas which contains some $N_2$ and other contaminant gases therein to again contact the adsorption material within the vessel 120 for removal of $N_2$ and other contaminants therefrom. Such purge flow is generally depicted by arrow P and also be arrow Q for return back into the adsorber vessel 120 (FIG. 5).

The vessel 120 has thus been fully prepared for returning back to the feed step. The reversible blower 150 can then be re-reversed to again drive airflow (along arrow H of FIG. 3) from the intake 130 (along arrow G) and through the vessel 120 (along arrow I). The control valve 165 with the purge recovery tank 160 can be closed just before the reversible blower 150 re-reverses, at the same time that the reversible blower 150 re-reverses, or shortly after the reversible blower 150 re-reverses.

Various factors such as the volume of gas which can reside within the various lines adjacent to the purge recovery tank 160 and whether the ASU 110 is to be optimized for $O_2$ purity, energy efficiency, or production rate, can be factored into determining precisely when the control valve 165 (or 167) should be returned to its closed state. Similar optimization can occur when determining when to initially open the control valve 165 and also when to initially close the control valve 165. The control valve 165 is re-closed so that it maintains a vacuum therein to make the purge recovery tank 160 most effective when it is again utilized in the next iteration of the cycle performed by the ASU 110.

Figure 6:
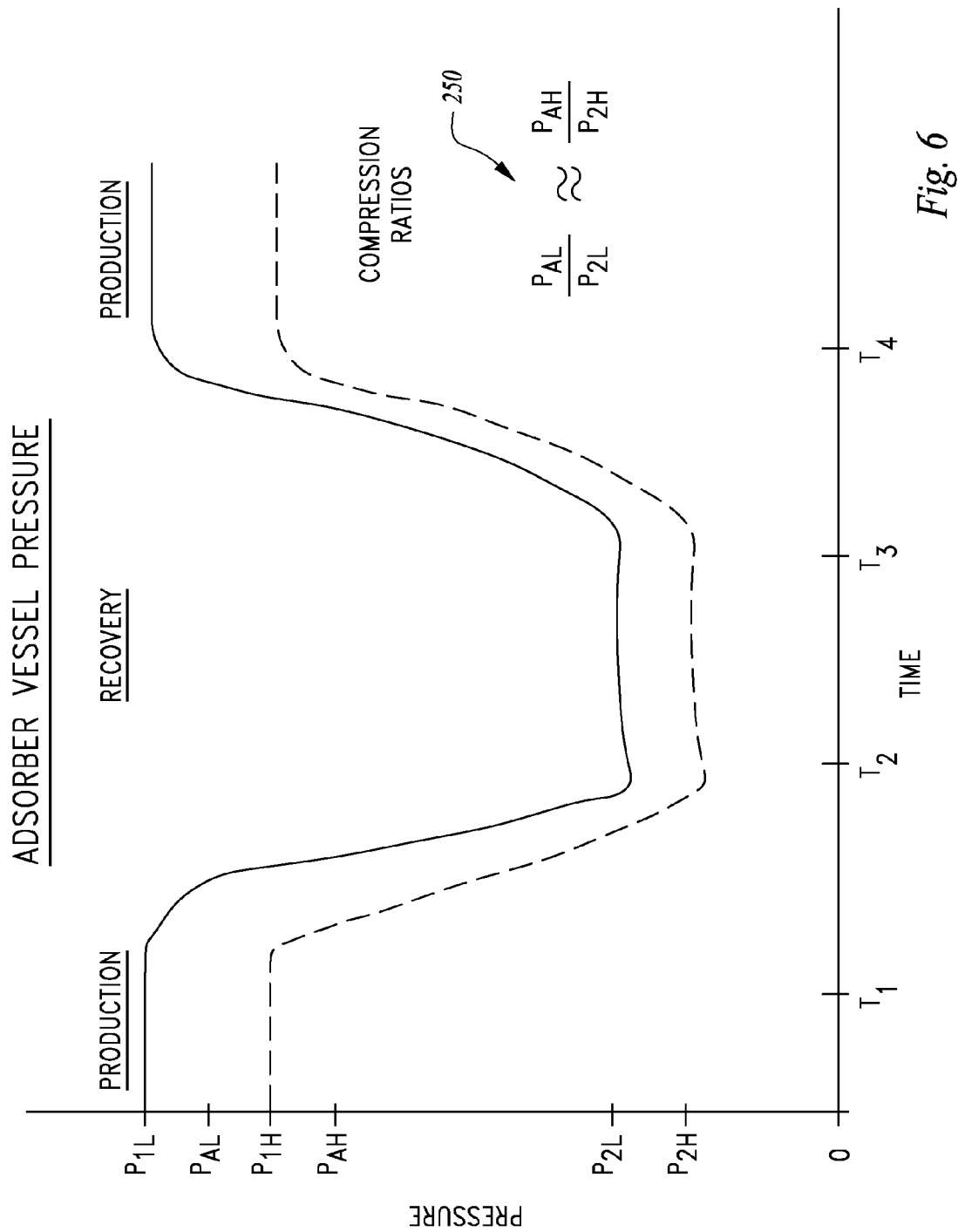
FIG. 6 is a graph of pressure in the adsorption bed versus time and illustrating how differing ambient pressures can be followed to maintain a desired pressure ratio across the blower.

With particular reference to FIGS. 5 and 6, details of a controller 240 and tuning of the ASU 110 as part of an ambient pressure optimization system 210 are disclosed according to one embodiment. Such an ambient pressure optimization system 210 is particularly useful when adjusting the ASU 110 (or system 10 (FIG. 1)) to operate at higher altitudes than sea level.

In essence, and with particular reference to FIG. 5, the ambient pressure optimization system 210 includes an ambient air pressure sensor 220 which senses pressure of air entering the air separation unit 110. A vessel pressure sensor 230 monitors pressure within the adsorber vessel 120 of the air separation unit 110. The controller 240 receives as inputs pressure from the ambient air pressure sensor 220 and pressure within the vessel 120, provided by the vessel pressure sensor 230. The controller then outputs a control signal 242 which controls operation of the reversible blower 150.

More particularly, and with continuing reference to FIGS. 5 and 6, the ambient air pressure sensor 220 is preferably coupled to a signal line 222 which leads to the controller 240. This ambient air pressure sensor 220 could merely be contained within the controller 240, or could have wireless communication rather than along the signal line 222. Furthermore, some other ambient air pressure sensor could merely measure pressure and these values could be utilized on a one time basis when setting up operation of the air separation unit 110, such as by entry of the expected ambient air pressure into a field within the controller 240 which is later utilized for operation, or this ambient air pressure can be utilized as an input into calculations which are then utilized on a one time basis to program the controller 240 for optimal operation.

The vessel pressure sensor 230 includes a signal line 232 to deliver a signal correlating to vessel pressure along the signal line 232. This signal line 232 could be replaced with a wireless signal or the controller could be placed directly upon the adsorber vessel 120 so that no signal line 232 would be required. The control signal 242 signals to the reversible blower 150 whether it needs to operate at a higher or lower flow rate, such as by adjusting power utilization by the reversible blower 150. Also, this control signal 242 can control whether the reversible blower 150 is operating in a forward production mode or in a reverse recovery mode and an amount of time between these modes of operation.

With particular reference to FIG. 6, a graph of pressure versus time is provided. A solid line on the graph provides a general representation of pressure across the reversible blower at standard pressure conditions (e.g. sea level pressure). In dashed lines correlating pressure for operation across the reversible blower 150 is depicted for high altitude operation. The various different pressure levels are annotated onto this graph of pressure versus time. $P_{1L}$ represents supply pressure within the vessel 120 when at the lower standard pressure elevation during a production mode. Pressure $P_{AL}$ represents ambient pressure at the lower altitude (e.g. sea level). Pressure $P_{1H}$ represents pressure within the vessel 120 when the reversible blower 150 is operating in a production mode but the air separation unit 110 is located at a high altitude. Pressure $P_{AH}$ represents ambient air pressure at the higher altitude. Pressure $P_{2L}$ represents the pressure within the adsorber vessel 120 when operating at the lower altitude (e.g. sea level) within the vessel 120 during the recovery mode when a vacuum is being drawn on the adsorber vessel 120. Pressure $P_{2H}$ represents pressure within the adsorber vessel 120 when the air separation unit 110 is in a recovery mode and operating at the higher altitude.

Various times are also depicted on the graph of FIG. 6. Time $T_1$ generally indicates when the air separation unit 110 is transitioning from a production mode to a recovery mode. Time $T_2$ represents when the transition to the recovery mode is complete. Time $T_3$ represents when the recovery mode has occurred for a specified amount of time and the adsorption media within the adsorber vessel 120 has sufficiently recovered for return of the air separation unit 110 to production mode. Time $T_4$ represents a time after which the air separation unit 110 has returned fully to the production mode.

This graph of pressure versus time in FIG. 6 could vary greatly depending on a variety of parameters such as demand/load for oxygen from the ASU 110, and whether the ASU 110 includes an $O_2$ process tank or other buffer tank within an $O_2$ output portion of the ASU 110 downstream of the adsorber vessel 120. Also, the existence of a purge recovery tank 160 and whether it is currently operating to purge the adsorber vessel 120 or not, will have an effect on this graph of pressure versus time (FIG. 6). Also, if the ASU 110 is operating in a continuously driven mode where it is either driving air into the adsorption vessel or drawing gas out of the adsorption vessel 120, a pressure curve which is closer to sinusoidal might be achieved. In this generalized depiction, when an optimal production pressure is achieved, it is held generally constant for a small amount of production time. Similarly, when a desired pressure within the adsorber vessel 120 is achieved for optimal recovery of the adsorption media within the adsorber vessel 120, this recovery pressure is merely maintained, rather than continuing to decrease.

An important parameter in the design of an SBRB VSA ASU, such as the ASU 110, is the pressure ratio across the reversible blower 150 when in the recovery mode and having reached an optimal vacuum pressure within the adsorber vessel 120. This optimal ambient-to-vacuum pressure ratio is to some extent dependent upon the type of reversible blower 150 being utilized, and the particular attributes of the adsorption media within the adsorber vessel 120. Other factors can also further influence what the optimal pressure ratio is.

Various different design parameters of the ASU 110 are influenced by the pressure ratio. For instance, tolerances within moving elements inside the reversible blower 150 might to some extent be dependent upon the pressure ratio to be achieved and maintained across the reversible blower 150. If tolerances are tighter, design decisions are made such as whether to implement greater amounts of lubrication or to require the holding of tighter tolerances during manufacture, and the extent to which temperature of operation needs to be factored into the design. These are just a few of the multitude of design decisions which go into designing an ASU 110 and particularly a reversible blower 150 therefore, which factor in the pressure ratio to be achieved.

When the ASU 110, so carefully designed, it is operated at a higher altitude, without proper optimization the efficiency with which the ASU 110 generates oxygen can be greatly compromised, or the system can be caused to otherwise operate outside of design and experience less reliable operation. Because much of the ASU 110 has been designed around the pressure ratio to be achieved for optimal performance, according to this invention that pressure ratio is matched for the particular high altitude operation involved.

In particular, this pressure ratio across the reversible blower is the ratio of ambient air pressure to the pressure within the adsorber vessel 120 during the recovery mode (between times $T_2$ and $T_3$ in the graph of FIG. 6). With this invention, and as depicted in the ambient-to-vacuum blower pressure ratio 250, this pressure ratio is kept approximately constant even when operating at a higher altitude and hence a lower ambient pressure. To maintain this pressure ratio, the vacuum pressure within the adsorber vessel 120 during the recovery mode when operating at high altitude is driven to a lower pressure than would be the case when the same equipment of the ASU 110 is operating at sea level or other design altitude. Thus, the same compression ratio is involved. As a result, the blower 150 continues to operate close to its design for optimal production efficiency and reliable operation over its service life.

Some non-linear results of maintaining this compression ratio include that drawing a vacuum on the adsorber vessel 120 is not a linear process, but takes a greater amount of time to achieve when the target vacuum pressure within the adsorber vessel 120 is a lower absolute pressure. Thus, the reversible blower 150 might need to operate for a greater amount of time to transition from the pressure ratio across the reversible blower 150 during the production mode (at time $T_1$ of FIG. 6), to when the reversible blower 150 has achieved the vacuum pressure desired within the adsorber vessel 120 (time $T_2$ of FIG. 6).

While the time between $T_1$ and $T_2$ would typically increase to achieve this desired pressure ratio, the time between $T_2$ and $T_3$ during which the air separation unit 110 is operating in recovery mode can be reduced. In particular, adsorption media typically achieves recovery not based on a pressure ratio, but rather based on absolute pressure therein. When the adsorption media is drawn into a more complete vacuum, it desorbs nitrogen (and other constituents such as water vapor and carbon dioxide) more quickly. Because maintenance of the optimal pressure ratio involves a lower absolute pressure during the vacuum recovery mode (when at high altitude), the adsorption media recovers more quickly. Hence, the adsorber vessel 120 can have the vacuum pressure for the recovery mode maintained over a shorter period of time before the desired degree of recovery of the adsorption media has been achieved. As a result, little or no increase in the overall cycle time is required (and potentially even a reduction in cycle time can be achieved to enhance performance of the system, or to counteract minor decreases in performance associated with operating at slightly off design ambient pressure conditions).

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A single bed reversing blower vacuum swing adsorption air separation unit optimized for high altitude operation, comprising in combination:

a ambient air inlet;

a reversible blower downstream of said ambient air inlet, said reversible blower coupled to a motor which drives said reversible blower in either a production direction to add pressure to ambient air entering said reversible blower from said ambient air inlet or dropping pressure downstream of said reversible blower by drawing gas through said reversible blower and out of said ambient air inlet;

an adsorption bed downstream of said reversible blower, said adsorption bed containing adsorption media therein which preferentially adsorbs $N_2$ over $O_2$;

an $O_2$ output downstream of said adsorption bed;

an adsorption bed pressure sensor; and a controller receiving a pressure signal from said adsorption bed sensor and providing a control signal to said reversible blower, said control signal causing said reversible blower to draw a vacuum pressure within said adsorption bed which causes an ambient-to-vacuum pressure ratio to match an optimal pressure ratio across said reversible blower.

2. The ASU of claim 1 wherein ambient pressure is known, with said ambient-to-vacuum pressure ratio calculated based on said known ambient pressure.

3. The ASU of claim 1 wherein an ambient pressure sensor is coupled to said controller, said controller calculating said ambient-to-vacuum pressure ratio based on pressure measured by said ambient pressure sensor.

4. The ASU of claim 1 wherein said controller includes an adsorption bed vacuum pressure set point based on altitude of the ASU, said controller operating to substantially match said set point for pressure within said adsorption bed.

5. The ASU of claim 1 wherein an $O_2$ process tank is located within said $O_2$ output and downstream of said adsorption bed, said $O_2$ process tank spaced from said adsorption bed by a valve to prevent back flow of oxygen into said adsorption bed.

6. The ASU of claim 5 wherein a purge recovery tank is located within said $O_2$ output, said purge recovery tank spaced from said adsorption bed by a control valve, said control valve selectively opening and closing under influence of said controller, with said control valve open after said adsorption bed pressure sensor detects the adsorption bed vacuum pressure needed to substantially match said ambient-to-vacuum pressure ratio.

7. The ASU of claim 1 wherein said controller reduces time between said reversible blower driving air from said air intake into said adsorption bed to driving gas out of said adsorption bed and back toward said ambient air inlet, relative to time when operating at standard atmospheric pressure.

8. A method for optimizing high altitude operation of a single bed reversing blower vacuum swing adsorption air separation unit (ASU), including the steps of:

selecting an adsorption bed pressure within an ASU having an ambient air inlet, a reversible blower downstream of the ambient air inlet, the reversible blower coupled to a motor which drives the reversible blower in either a production direction to add pressure to ambient air entering the reversible blower from the ambient air inlet or dropping pressure downstream of the reversible blower by drawing gas through the reversible blower and out of the ambient air inlet, an adsorption bed downstream of the reversible blower, the adsorption bed containing adsorption media therein which preferentially adsorbs $N_2$ over $O_2$, an $O_2$ output downstream of the adsorption bed, an adsorption bed pressure sensor and a controller receiving a pressure signal from the adsorption bed sensor and providing a control signal to the reversible blower, the control signal causing the reversible blower to draw a vacuum pressure within the adsorption bed which causes an ambient-to-vacuum pressure ratio to match an optimal pressure ratio across the reversible blower;

causing an ambient-to-vacuum pressure ratio to match an optimal pressure ratio across the reversible blower; and reversing the reversible blower after the pressure sensed within the adsorption bed is sufficiently low to cause the optimal pressure ratio to be achieved.

9. The method of claim 8 including the further step of measuring ambient pressure; and determining what vacuum pressure within the adsorption bed would cause the ambient-to-vacuum pressure ratio to match the optimal pressure ratio.

10. The method of claim 9 including the further step of adjusting time between initiation of reversing of the reversible blower to draw a vacuum on the adsorption bed, to re-reversing the reversible blower to again cause air to be driven into the adsorption bed, to accommodate changes in recovery of media within the adsorption bed based on changes in the vacuum pressure achieved within the adsorption bed.

11. A method for optimizing vacuum pressure settings to compensate for high altitude operation of a single bed reversing blower vacuum swing adsorption air separation unit, the method including the steps of:

identifying a desirable ambient-to-vacuum pressure ratio across a reversible blower downstream of an ambient air inlet and upstream of an adsorption bed containing adsorption media which preferentially adsorbs $N_2$ over $O_2$;

determining ambient air pressure;

selecting a vacuum pressure within the adsorption bed which causes the ratio of ambient air pressure of said determining step to vacuum pressure of said selecting step to match the desirable ambient-to-vacuum pressure ratio of said identifying step; and operating the blower to cause pressure in the adsorption bed to substantially match the vacuum pressure of said selecting step.

12. The method of claim 11 including the further step of operating the reversible blower in a production mode to cause the adsorption bed to have a production pressure, and operating the reversible blower in a recovery mode to draw a vacuum on the adsorption bed, with the vacuum pressure lower than the production pressure, the pressure caused by the blower during said operating step being the vacuum pressure caused by the reversible blower when operating in the recovery mode.

13. The method of claim 11 including the further step of adjusting time between reversing blower driving of air into the adsorption bed and reversible blower drawing of gas out of the adsorption bed to account for changes in time required for recovery of adsorption media.

14. The method of claim 13 wherein said adjusting time step includes decreasing time from that of said identifying step.

15. The method of claim 11 wherein said identifying step includes the desirable ambient-to-vacuum pressure ratio being a pre-established ratio.

16. The method of claim 11 wherein said desirable ambient-to-vacuum pressure ratio of said identifying step is calculated empirically through operation of the ASU at standard atmospheric pressure.

17. The method of claim 11 wherein said determining step includes measuring ambient air pressure.

18. The method of claim 11 wherein said determining step includes calculating ambient air pressure based on altitude of the ASU.

* * * * *